Feb. 28, 1928. 1,660,326

G. ENGELHARDT

FOOT ARCH MEASURING DEVICE

Filed June 8, 1926

Inventor:
Georg Engelhardt
By ............
Atty.

Patented Feb. 28, 1928.

1,660,326

UNITED STATES PATENT OFFICE.

GEORG ENGELHARDT, OF CASSEL, GERMANY.

FOOT-ARCH-MEASURING DEVICE.

Application filed June 8, 1926, Serial No. 114,423, and in Germany June 8, 1925.

The invention consists in a foot-arch measuring appliance, especially an arch-pressure head adapted to be commonly used for both feet, a lever transmission connected therewith and provided with an axle and a pointer, and a scale permitting the reading of the measuring results.

One characteristic of the novelty of the present invention consists especially in this, that the measuring appliance is only one-sided, and therefore has only one arch pressure head, only one lever transmission, and only one scale, while however both feet can be measured therewith.

A further characteristic of the improvement is that the measuring operation is not carried out as heretofore with the feet being placed on the measuring device, but while the person is sitting, say with the legs crossed or with the foot held side-ways, the measuring appliance is lightly pressed against the foot joint. In this way, the measuring is accomplished more quickly and entirely in relaxed position, since the foot only bears against the base plate and the side wall.

A further advantage is that the measuring appliance itself is only about three-quarters of a size of a foot, thus five times smaller than the heretofore known devices, and is more easily handled. It can be carried on a belt. Because of the simpler and yet more practical construction, the measuring appliance can also be manufactured considerably cheaper.

Figure 1:
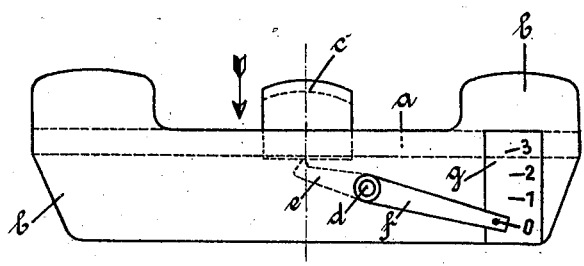
Figure 2:
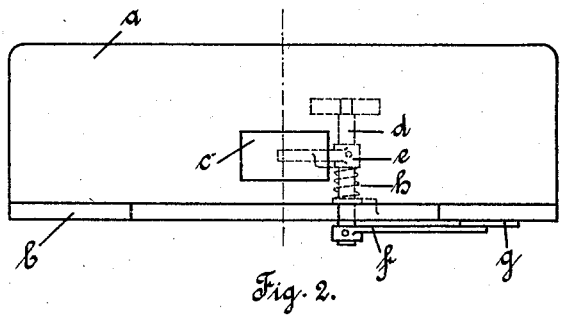
Figure 3:
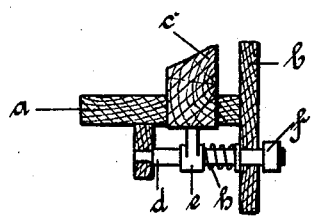

In the drawing is shown by way of example an embodiment, and Fig. 1, representing a longitudinal view, Fig. 2 a plan view, and Fig. 3 a cross-section taken through the center of the measuring appliance.

The measuring appliance consists of the frame proper, the base plate $a$, and the side wall $b$, on which frame are provided the arch pressure head $c$, the axle $d$ carrying the lever $e$ and the pointer $f$, and the scale $g$.

The lever $e$ and the pointer $f$ carried by the common axle $d$ are held continuously under pressure by a helical spring $h$, which pressure by the lever $e$ is transmitted to the arch pressure head $c$.

In the measuring operation, the measuring appliance is pressed against the foot in such a way that the foot which bears against the two projections of the side wall $b$ entirely rests on the base plate $a$. The abnormal foot, that is the flat foot, will exert a pressure on the arch pressure head $c$, whereby the same is moved in the direction of the arrow (Fig. 1) which movement by the transmission of the lever $e$ and the pointer $f$ is read on the scale $g$.

The transmission of the measurement from the arch pressure head to the scale can also be accomplished by other means without departing from the spirit of the invention as specified in the appended claims.

I claim:

1. In an appliance for measuring articular arches, a base board adapted to be pressed against a foot to be measured, projections on one side of said board for positioning the foot, a movable head for engaging the arc of the foot, means normally moving the lead into contact with the arch, and means to indicate the movement of the head and therefore the height of the arch.

2. In the structure defined in claim 1, said indicating means comprising a scale fixed on said base board, and a lever pivoted on said base board, one end of said lever engaging said movable head, the other end of said lever cooperating with said scale.

3. In the structure defined in claim 1, said means comprising a scale fixed on said base board, a lever pivoted on said base board, one end of said lever engaging said movable head, the other end of said lever cooperating with said scale, and spring means for maintaining the first end of said lever in contact with said movable head.

In testimony whereof I affix my signature.

GEORG ENGELHARDT.